United States Patent Office 2,832,078
Patented Apr. 29, 1958

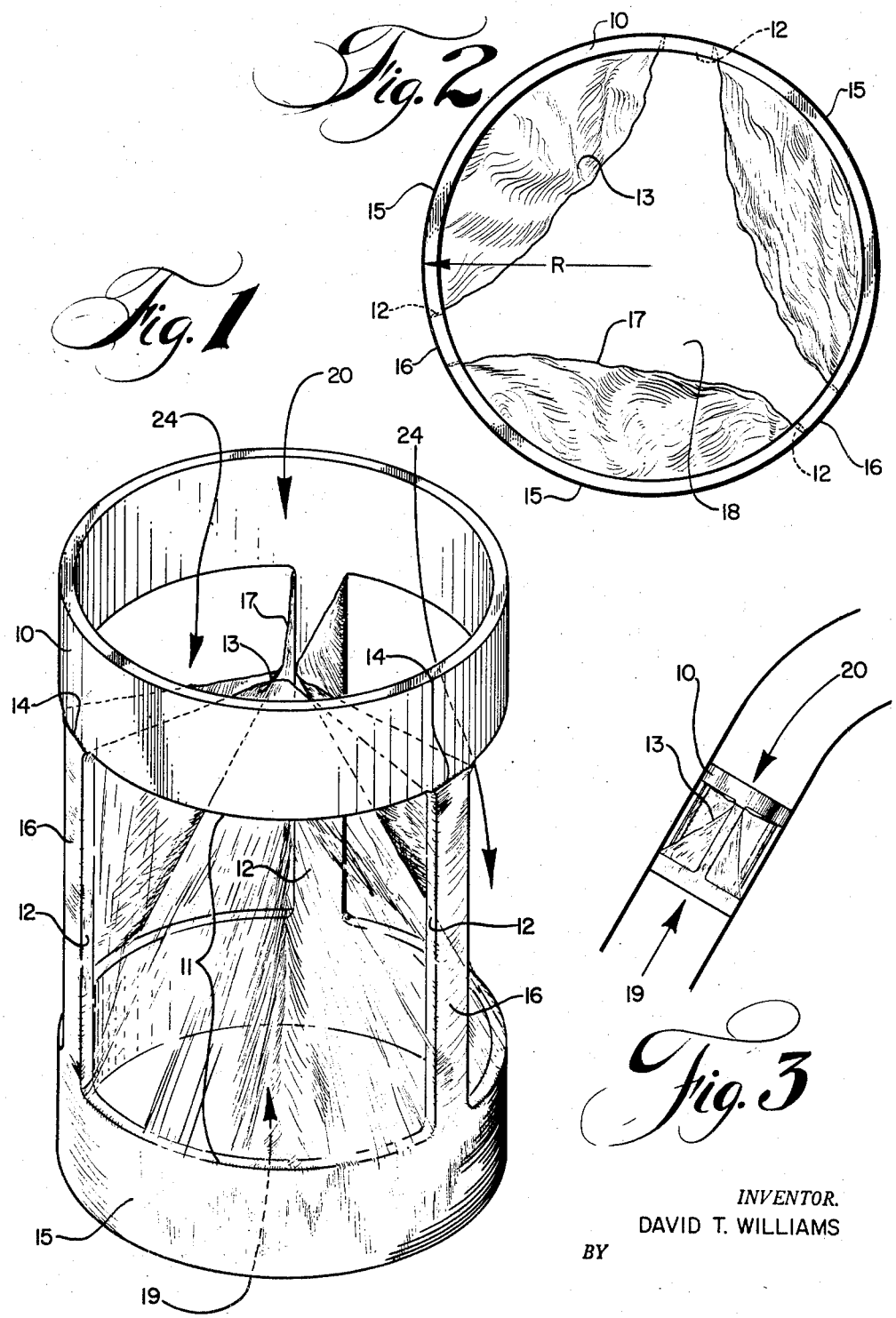

2,832,078

HEART VALVE

David T. Williams, Worthington, Ohio, assignor to Battelle Memorial Institute, Columbus, Ohio, a corporation of Ohio Application October 17, 1956, Serial No. 616,571

Your petitioner hereby enters this disclaimer to all claims in the specification 1 Claim. (Cl. 3—1)

This invention relates to a new type of valve and particularly to a valve which is ideally suited to replace a damaged or destroyed human aortic heart valve.

Since this invention is used only for the relief of suffering of mankind, all rights in the full term of this patent are dedicated to the public to use the invention freely in any manner.

Development of prosthesis for the aortic heart valve is a subject of considerable recent interest in surgery. One device now marketed for use as a possible replacement, or rather substitute, for a defective aortic valve is a ball-and-seat valve made of plastic. This device is inserted in place of an excised section of the descending aorta. It closes at each heart beat with an audible click, and maintains full pressure in the arterial system of the trunk and legs. Defects may be found to exist in the ball-and-seat-type valve that have not yet been discovered. Some possible deficiencies are known already and are the following:

(a) The valve is suspected of crushing red blood corpuscles when it closes. This action would be serious in causing disease.

(b) The valve is large and bulky, and makes an audible noise.

(c) The arterial pressure is not maintained in the coronary, carotid, or pectoral arteries, since the valve cannot be placed where the natural valve is located, below the openings of the coronary arteries.

A new type of artificial valve has now been discovered which is simple in design and function and which may be employed to replace many of the fluid-controlling valves now in use which serve to open and close a passage in response to the reverse flow of fluids, such as is present in vessels leading to and from the heart. This valve is particularly adaptable and useful as an artificial heart valve, in that it overcomes many of the undesirable features of prior art devices employed in this respect. However, it is obvious that such a valve may be employed for many functions outside of merely replacing the valve of a human heart, where prior art valves have failed to function as satisfactorily as the present device.

It is therefore an object of the present invention to provide a new valve that opens and closes a passageway in response to and in accordance with the direction of fluid flow.

It is also an object of the present invention to provide a device which will permit the flow of fluid in a passageway in one direction but which will substantially stop the flow in an opposite direction.

A further object of the present invention is to provide a new artificial heart valve.

A still further object of the present invention is to provide an artificial aortic heart valve.

Other applications of the present device will be obvious in the following specification and examples.

In general the present invention relates to a valve comprising a tube-shaped frame to which a membrane is attached (a) around one circumference and (b) along three axial lines. The membrane is flexible so that it might depart from the tube wall at any point except along the lower circumference and along axial lines to which it is attached. There is sufficient "slack" or excess membrane to allow the membrane sections between the axial lines to come together inside the rigid tube or frame, thus making a multiple sac valve.

Fig. 1 is a perspective view showing one embodiment of the present valve.

Fig. 2 is a plan view of the valve.

Fig. 3 is a cross-sectional view of the valve of the present invention as placed in a human aorta.

In Fig. 1, 10 is a rigid tube or frame. In the embodiment illustrated by Fig. 1, sections of tube 10 have been removed in order to provide open spaces as at 11 and to provide three equally spaced ribs 12. Membrane 13 is a tubular shaped membrane of slightly larger diameter than the frame or tube 10 and is telescoped over tube 10. The upper edge of member 13 falls short of reaching the upper solid portion of frame 10, as at 14. Membrane 13 is attached to frame 10 around the entire outside circumference as at 15 and along the longitudinal ribs 12, as illustrated at 16. In the present embodiment a plastic resinous membrane 13 is attached to a steel frame 10 by heating the plastic while in contact with the metal to form an adhesive bound or weld between the two materials. A fluid-tight bond is thus obtained. Membrane 13 has been projected through open area 11 of tube 10 to form a three-sac valve inside tube 10.

In Figs. 1 and 2, 17 illustrates the top edge of membrane 13. For use as a three-sac heart valve it is preferable that ribs 12 where membrane 13 is longitudinally attached to the ribs or frame be equally spaced around the tube, and the length of the top of membrane 13, as at 17 where the valve seals, is about 6R where R is the tube radius. Fig. 2 shows the valve in the "open" position. 18 is the opening between the three-sac formation of the valve.

When in operation the valve is mounted in a tube or passageway as illustrated by Fig. 3. When liquid is directed through the valve as shown by arrow 19 of Figs. 1 and 3 the force of the liquid will push against the inside surface of the three saclike membranes of membrane 13 forcing them outwardly and opening the valve to a position such as shown by Fig. 2 thus allowing liquid to flow freely through the valve. When the flow or pressure of fluid is reversed, such as occurs in the pulmonary artery when the heart ceases to contract and proceeds to expand causing blood to flow into the ventricles, the flow or pressure tends to go in direction 20, as illustrated in Figs. 1 and 3. This causes pressure or force to push against the outside or top section of the three-sac membrane forcing the three sections of the membrane to come together as illustrated by the position of the valve in Figs. 1 and 3, thus substantially preventing the flow of liquid in direction 20 which is the purpose of the valve. In operation, the liquid would alternatively flow in directions 19 and 20 in a pulsating manner causing the saclike membrane to open and close, also in a pulsating manner.

It is obvious from the above description that a greater number of sacs or membrane sections than three may be employed. However, if the membrane should close to make a three-sac valve, the total length along the top of the membrane where the valve seals, is preferably about 6R where R is the tube radius. When the valve is open, the membrane lying flat against the inside of the tube, the length of the membrane should be about $2\pi R$ or $6.2832R$. By adhering to these measurements the valve will be capable of closing tightly against flow in one direction, and opening wide to permit completely unimpeded flow in the other direction.

Obviously the valve of the present invention is not restricted to the exact structure illustrated by Figs. 1 to 3. Modifications include a valve in which frame 10 is a solid tube which does not contain void areas 11 or ribs 12. In such a modification, it is necessary to attach membrane 13 to the inside of the tube around the inside circumference corresponding to the outside circumference 15 of Fig. 1 and along longitudinal lines on the inside of the tube corresponding to areas 16 of ribs 12.

To illustrate the valve of the present invention, a series of valve frames was designed and machined from AISI type 302 stainless steel tubing as shown by Fig. 1. The valves were at length fabricated by wrapping these frames with a single layer of .002-inch-thick sheet of polyfluoroethylene and cemented to the frames around the bottom circumference and up the side post or ribs, as shown by Figs. 1 and 3. The polyfluoroethylene was then pushed inwardly from the sides and stretched until it made a satisfactory seal at the center. The plastic used was a cast Teflon film (Teflon is a trade name of polyfluoroethylene produced by Du Pont de Nemours Company) the grade employed being No. 852–201, a clear dispersion, cured at sufficiently high temperature so that no plasticizer remained. The Teflon used was a cast Teflon film; however, extruded, rolled, or skived material could be used as well.

The following procedure was found to produce a very satisfactory bond between the Teflon membrane and the stainless steel frame:

(a) The stainless steel was cleaned with No. 400 emery cloth.

(b) The steel was baked at 400° C. for one hour and allowed to cool.

(c) The steel frames were then brush-coated with clear Teflon dispersion No. 852–201 (polyfluoroethylene) and dried for 30 minutes at 93° C. Then the frames were baked for ten minutes in an oven at 400° C.

(d) Cast and sintered Teflon tape was then clamped tightly against the coated stainless steel surface. The steel and clamp were put into a 400° C. oven for one-half hour.

(e) The steel and clamp were then removed and allowed to cool.

(f) A layer of cast and cured .002-inch Teflon tape was wrapped around the outside of the frames, lapped exactly over the ribs of the frame. One tape edge was a little below the upper band of the frame as shown in Fig. 1; the other was below the lower band.

(g) The frame with Teflon around it was wrapped tightly from end to end with fine copper wire (26 gage). The wire entirely covered the Teflon tape.

(h) Three hemostats were clamped to the Teflon membrane at the top, to hold the Teflon as close as possible to the post, and cause a weld of Teflon to the Teflon coat just inside the posts. The hemostats were lashed to a metal support coaxial with the valve, so as to avoid any sagging in the plastic during the cure.

(i) The entire assembly was set into the oven at 400° C. for 12 minutes, then removed and allowed to cool.

The membranes were allowed to shrink during the curing so that they were tightly spread over the frames, but the welds all held very firm and sound. The sacs of the valve were now carefully stretched until they met in the center. The valves were then put into a water line and carefully subjected to about 20 pounds per square inch of back pressure. This assisted in further forming the three-sac valve, causing the sacs to stretch and belly inward a little, and to seal reasonably well.

Several valves fabricated in the manner described were put into an artificial heart pump. The operations of the valve were considered quite satisfactory in that the resistance to forward flow was small, the resistance to back flow was large, and leakage was not excessive. The membrane of thickness .002 inch was considered a little too stiff. Subsequently the valves were made with membranes only .001 inch thick.

Tests to destruction were carried out on valves made in the manner described of .001-inch Teflon. The sacs were found to burst in two cases at 35 pounds per square inch and 32 pounds per square inch of back pressure. The maximum pressure in the body of the valve is considered to be about 200 millimeters of mercury (200 mm. Hg), or 3.87 pounds per square inch, so that the strength observed is considered quite adequate for use as heart valves.

The above examples are given to illustrate one embodiment of the valve of the present application and do not restrict the scope of the present invention. The materials employed are by way of example only, it being obvious that any materials possessing sufficient strength and corrosive resistivity to the environment in which the valve will be used, may be employed. For example when used in conjunction with the human heart it may be desirable to use a solid plastic frame as well as a flexible plastic membrane.

What is claimed is:

An artificial heart valve comprising: a pair of longitudinally, terminally spaced, annular frame members held in a fixed spaced relation by three longitudinally disposed rib members, intersecting said frame members substantially at right angles and joined thereon at the periphery and at the surface thereof, said frame and rib members being made of a nontoxic material with respect to the human body, said frame and rib members defining a cylindrical shell structure having three windows equally spaced in the wall thereof; a flexible, plastic membrane member of a thickness of about .001 inch, fused fluid-tight at one end on one of said frame members around the periphery thereof; said membrane member overlaying each of said rib members and fused fluid-tight thereon; said membrane member being free at the other end and formed into contact along the inner side of the second end edge in the closed position of the valve; and said membrane member being operable by fluid pressure in the first end thereof to flex said member outward and to allow fluid flow through the valve.

References Cited in the file of this patent

UNITED STATES PATENTS

| | | |
|---|---|---|
| 2,674,318 | Sutliff | Apr. 6, 1954 |
| 2,682,057 | Lord | June 29, 1954 |